US012243019B2

United States Patent
Rajbhoj et al.

(10) Patent No.: US 12,243,019 B2
(45) Date of Patent: Mar. 4, 2025

(54) AUTOMATED EXTRACTION AND CLASSIFICATION OF PROJECT INITIATION RELATED INFORMATION FROM REQUEST FOR PROPOSAL RESPONSE DOCUMENTS

(71) Applicant: Tata Consultancy Services Limited, Mumbai (IN)

(72) Inventors: Asha Sushilkumar Rajbhoj, Pune (IN); Padmalata Venkata Nistala, Hyderabad (IN); Vinay Kulkarni, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 340 days.

(21) Appl. No.: 18/059,650

(22) Filed: Nov. 29, 2022

(65) Prior Publication Data

US 2023/0267418 A1    Aug. 24, 2023

(30) Foreign Application Priority Data

Feb. 22, 2022   (IN) .............................. 202221009417

(51) Int. Cl.
*G06F 16/35*     (2019.01)
*G06F 16/3329*   (2025.01)
(Continued)

(52) U.S. Cl.
CPC ....... *G06Q 10/103* (2013.01); *G06F 16/3329* (2019.01); *G06F 16/35* (2019.01); *G06V 30/416* (2022.01)

(58) Field of Classification Search
CPC ............ G06Q 10/103; G06Q 10/06313; G06F 16/3329; G06F 16/35; G06V 30/416; G06V 30/41; G06V 30/10
See application file for complete search history.

(56) References Cited

U.S. PATENT DOCUMENTS 10,810,643 B2   10/2020  Rajbhoj et al.
11,501,233 B2 * 11/2022  Sabharwal ............. G06N 3/045
(Continued)

OTHER PUBLICATIONS

Maji, Subhadip et al., "An Interpretable Deep Learning System for Automatically Scoring Request for Proposals", Machine Learning, Date: Aug. 2020, Publisher: Arxiv, https://arxiv.org/pdf/2008.02347.pdf.

*Primary Examiner* — Abul K Azad
(74) *Attorney, Agent, or Firm* — FINNEGAN, HENDERSON, FARABOW, GARRETT & DUNNER LLP

(57) ABSTRACT

This disclosure relates to the field of project related document analysis. Conventionally, process of retrieving right information related to a stakeholder with relevant project initiation concerns involves manual intervention resulting in more time consumption. The method of the present disclosure describes a system and method for automated extraction and classification of project initiation related information from request for proposal response documents The RFP response document is parsed using document structure based parsing technique to identify questions and answers. The questions from the RFP response document are classified into different classes of interest and important information from the answers are extracted and mapped to an identified class. The method of the present disclosure demonstrates significant improvement in terms of time consumption by reducing volume of information and providing a quick access to class-specific relevant information from the RFP response document.

12 Claims, 7 Drawing Sheets

(51) Int. Cl.
*G06Q 10/10* (2023.01)
*G06V 30/416* (2022.01)

(56) References Cited

U.S. PATENT DOCUMENTS

| | | | |
|---|---|---|---|
| 11,755,973 B2* | 9/2023 | Krishna | G06F 16/3329 |
| | | | 705/7.28 |
| 2013/0031098 A1* | 1/2013 | Kuroiwa | G06F 40/194 |
| | | | 707/E17.089 |
| 2021/0216719 A1* | 7/2021 | Mahindru | G06F 40/295 |
| 2022/0222440 A1* | 7/2022 | Chowdhury | G06F 16/3344 |

* cited by examiner

Question 4: Detail the Cost Drivers and how they are to be managed for this Contract

Para 1 ABC Corp.' core pricing philosophy is based on the fact that our clients require results and bottom line benefits as a direct and measurable output of our engagement. We believe that the fundamental business value that we will be able to deliver to our clients are substantial cost savings backed-up by a robust commercial and operational relationship. This will enable flexibility and responsiveness to the dynamic business needs for AWater.

Para 2 We continually strive to deliver the most optimal business solution to you that drive the key imperatives of cost, quality and speed of implementation in perfect balance. However, there are several cost drivers that have specific dependencies on scale, complexity and other key elements of the project and can be impacted through collaborative efforts between the client and ABC Corp. Outlined below are some of the key cost drivers and their impact on pricing for the contract period.

Para 3 ABC Corp. believes in right staffing of resources' and post undergoing the current scope of work for AWater, ABC Corp. is confident to start the delivery of the services with 21 FTE's as against a 23 FTE requirement as per the volume & AHT shared in the scope documents.

Para 4 The extensive knowledge and expertise available within ABC Corp. for similar scope of services has ensured a ready pool of resources who have worked in similar services and can be deployed at the start of the project.

Para 5 We will provide the FTE benefit of 7 FTE's over the 5 years term which equates to 31% benefits. This translates to GBP 245,060+ savings for AWater.

Para 6 In addition to the upfront benefit ABC Corp. would leverage its Process re-engineering capabilities along with Automation capability to continuously bring across Transformation of the process to ensure a planned reduction in the overall FTE requirement to deliver the same set of services in collaboration with AWater.

Para 7 A 31% FTE reduction glide path has been designed for Awater using Transformation of the process (please refer to response # 'a' for details of the entire Transformation Journey)) & Right Resourcing throughout the contract period which is depicted in the below graph:

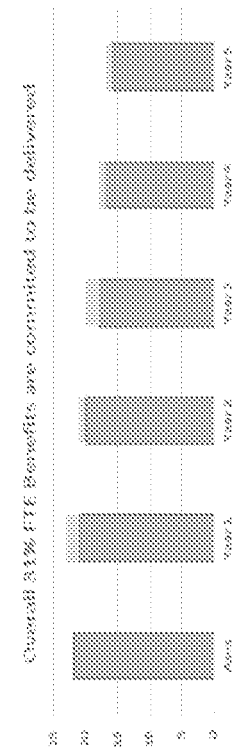

Figure 1: FTEs Benefits proposed for the contract period

Para 8 ABC Corp. further believes that development of the right skillsets of the resources through the contract period will ensure availability of cross trained resources further enabling cost management for the contract life cycle.

FIG. 4

QUESTION 4: Detail the Cost Drivers and how they are to be managed for this Contract We continually strive to deliver the most optimal business solution to you that drive the key imperatives of cost, quality and speed of implementation in perfect balance. However, there are several cost drivers that have specific dependencies on scale, complexity and other key elements of the project and can be impacted through collaborative efforts between the client and ABC Corp.. Outlined below are some of the key cost drivers and their impact on pricing for the contract period.

ABC Corp. believes in right staffing of resources' and post undergoing the current scope of work for AWater, ABC Corp. is confident to start the delivery of the services with 21 FTE's as against a 23 FTE requirement as per the volume & AHT shared in the scope documents.

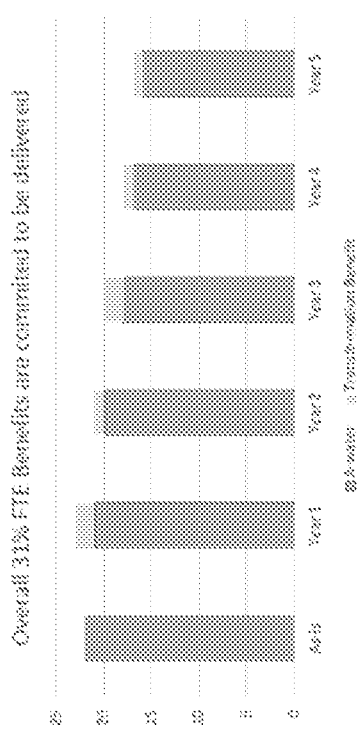

We will provide the FTE benefit of 7 FTE's over the 5 years term which equates to 31% benefits. This translates to GBP 245,000+ savings for AWater A 31% FTE reduction glide path has been designed for AWater using Transformation of the process (please refer to response # 'a' for details of the entire Transformation Journey)) & Right Resourcing throughout the contract period which is depicted in the below graph.

ABC Corp. further believes that development of the right skillsets of the resources through the contract period will ensure availability of cross trained resources further enabling cost management for the contract life cycle.

FIG. 5

AUTOMATED EXTRACTION AND CLASSIFICATION OF PROJECT INITIATION RELATED INFORMATION FROM REQUEST FOR PROPOSAL RESPONSE DOCUMENTS

PRIORITY CLAIM

This U.S. patent application claims priority under 35 U.S.C. § 119 to: Indian Patent Application No. 202221009417, filed on 22 Feb. 2022. The entire contents of the aforementioned application are incorporated herein by reference.

TECHNICAL FIELD

The disclosure herein generally relates to the field of document analysis, and, more particularly, to automated extraction and classification of project initiation related information from request for proposal response documents.

BACKGROUND

A project includes a set of tasks that utilizes resources such as money, people, materials, energy, space, provisions to achieve project objectives. Project planning starts with a project initiation phase in which high-level project objectives, commitments, requirements, and risks are identified. Project Initiation (PI) is a key transition phase from a team involved in customer interactions to other teams implementing the project. For example, in an organization, typically sales team gets involved in the customer interaction and delivery teams work on the implementation of the project to achieve the project objectives. Success of the project is often influenced by effectiveness of handover of information to the delivery team as the delivery team is responsible to deliver all technical commitments made in a response to request to proposal (RFP) document. The sales/presales team prepares response to Request for Proposal (RFP) and then after winning deal, RFP response document is handed over to the delivery team for project execution.

Current industry practice largely relies on a project manager's experience to carry out the project initiation activities keeping in view customer context and commitments made. Many times, important information is missed during the transfer of information from sales to delivery team resulting in not meeting customer expectations and delivery slippages.

Software RFP response documents contain important information on factors that impact success of software projects. The RFP response document comprises solutions to client questions pertaining to project, organization, capability, approach, scope, commitments, and many other project related information and can be a good information source to leverage in an automated approach to provide a jump start to the project initiation process. However, as the RFP response document is in natural language, it is vulnerable to multiple interpretations. Also, large size of RFP response document may exacerbate the problem further. Typically, the RFP response document can run into hundreds of pages and relevant information of interest may spread all over the RFP response document. Hence, it takes time and effort to manually retrieve right information related to a stakeholder with relevant project initiation concerns. Thus, project initiation is required to be automated.

There exist some conventional approaches for analyzing RFP documents for using in requirements engineering, requirement identification, extract scope, expected service levels, and/or the like. The conventional approaches use documents indexing excluding non-stop words contained documents for information retrieval system. However, indexing based on entire document content gives a high number of false positives as they do not exploit the semantic aspect of the problem domain. Few other conventional approaches use machine learning and/or deep learning approaches to identify named entities and classification. Many of these approaches use WordNet to take into account synonymic and hyponymic variations in text. These conventional approaches may pose limitations for domain-specific applications, as weightage of all words is considered same in absence of a domain-specific vocabulary. A word can be used in multiple contexts, hence a pure text-based match may retrieve irrelevant information and misleading ranking. Natural language processing (NLP) is extensively used in information extraction from documents. On NLP front, few existing techniques propose indexing using named entity. Information about entities is being used for retrieval methods and to expand query with entities. However, named entity retrieval work is not directly applicable for project initiation information extraction.

SUMMARY

Embodiments of the present disclosure present technological improvements as solutions to one or more of the above-mentioned technical problems recognized by the inventors in conventional systems. For example, in one embodiment, a processor implemented method is provided. The method comprising receiving, via one or more hardware processors, a Request for Proposal (RFP) response document and a configurable extraction pattern as inputs, wherein the configurable extraction pattern specifies a heading and style related information of the RFP response document; extracting, via the one or more hardware processors, a plurality of questions and a plurality of corresponding answers by analyzing the Request for Proposal (RFP) response document based on the configurable extraction pattern; classifying, via the one or more hardware processors, each of the plurality of questions into at least one project initiation class of a set of predefined project initiation classes based on a comparison of a configurable threshold value with a probability score computed using a pre-trained machine learning model; processing, via the one or more hardware processors, each of the plurality of corresponding answers to extract a plurality of project initiation related information using one or more classifiers, wherein the plurality of project initiation related information is extracted by processing text information and images present in each of the plurality of corresponding answers; generating, via the one or more hardware processors, a plurality of class specific documents with the plurality of project initiation related information; and composing, via the one or more hardware processors, one or more stakeholder specific documents involved in project initiation process based on the plurality of class specific documents, wherein the one or more stakeholder specific documents are further shared with corresponding one or more stakeholders for project related resource planning.

In another aspect, a system is provided. The system comprising a memory storing instructions; one or more communication interfaces; a question and answer extractor, one or more classifiers, a project initiation kit generator, a Natural Language Processing (NLP) engine, and one or more hardware processors coupled to the memory via the one or more communication interfaces, wherein the one or more hardware processors are configured by the instructions to receive, via one or more hardware processors, a Request for Proposal (RFP) response document and a configurable extraction pattern as inputs, wherein the configurable extraction pattern specifies a heading and style related information of the RFP response document; extract, via the one or more hardware processors, a plurality of questions and a plurality of corresponding answers by analyzing the Request for Proposal (RFP) response document based on the configurable extraction pattern; classify, via the one or more hardware processors, each of the plurality of questions into at least one project initiation class of a set of predefined project initiation classes based on a comparison of a configurable threshold value with a probability score computed using a pre-trained machine learning model; process, via the one or more hardware processors, each of the plurality of corresponding answers to extract a plurality of project initiation related information using the one or more classifiers, wherein the plurality of project initiation related information is extracted by processing text information and images present in each of the plurality of corresponding answers; generate, via the one or more hardware processors, a plurality of class specific documents with the plurality of project initiation related information; and compose, via the one or more hardware processors, one or more stakeholder specific documents involved in project initiation process based on the plurality of class specific documents, wherein the one or more stakeholder specific documents are further shared with corresponding one or more stakeholders for project related resource planning.

In yet another aspect, a non-transitory computer readable medium is provided. The non-transitory computer readable medium comprising receiving, via one or more hardware processors, a Request for Proposal (RFP) response document and a configurable extraction pattern as inputs, wherein the configurable extraction pattern specifies a heading and style related information of the RFP response document; extracting, via the one or more hardware processors, a plurality of questions and a plurality of corresponding answers by analyzing the Request for Proposal (RFP) response document based on the configurable extraction pattern; classifying, via the one or more hardware processors, each of the plurality of questions into at least one project initiation class of a set of predefined project initiation classes based on a comparison of a configurable threshold value with a probability score computed using a pre-trained machine learning model; processing, via the one or more hardware processors, each of the plurality of corresponding answers to extract a plurality of project initiation related information using one or more classifiers, wherein the plurality of project initiation related information is extracted by processing text information and images present in each of the plurality of corresponding answers; generating, via the one or more hardware processors, a plurality of class specific documents with the plurality of project initiation related information; and composing, via the one or more hardware processors, one or more stakeholder specific documents involved in project initiation process based on the plurality of class specific documents, wherein the one or more stakeholder specific documents are further shared with corresponding one or more stakeholders for project related resource planning.

In accordance with an embodiment of the present disclosure, each of the set of predefined project initiation classes comprises information relevant to one or more stakeholders involved in the project initiation process.

In accordance with an embodiment of the present disclosure, the one or more classifiers utilize a domain specific dictionary and natural language processing based techniques for processing text information and an optical character recognition technique for processing images comprised in each of the plurality of corresponding answers.

In accordance with an embodiment of the present disclosure, the step of classification is preceded by a preprocessing step that includes removal of stop words, conversion of words into root form using lemmatization, and replacing taxonomical variations in words with common words from the domain specific dictionary.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 depicts an example of a part of RFP response document comprising one question and a corresponding answer received as an input by the system of FIG. 1, according to some embodiments of the present disclosure.

FIG. 5 depicts an example of a class specific information generated as an output by the system of FIG. 1 for the example of the part of the RFP response document of FIG. 4 comprising one question and the corresponding answer, in accordance with some embodiments of the present disclosure.

DETAILED DESCRIPTION

Figure 1:
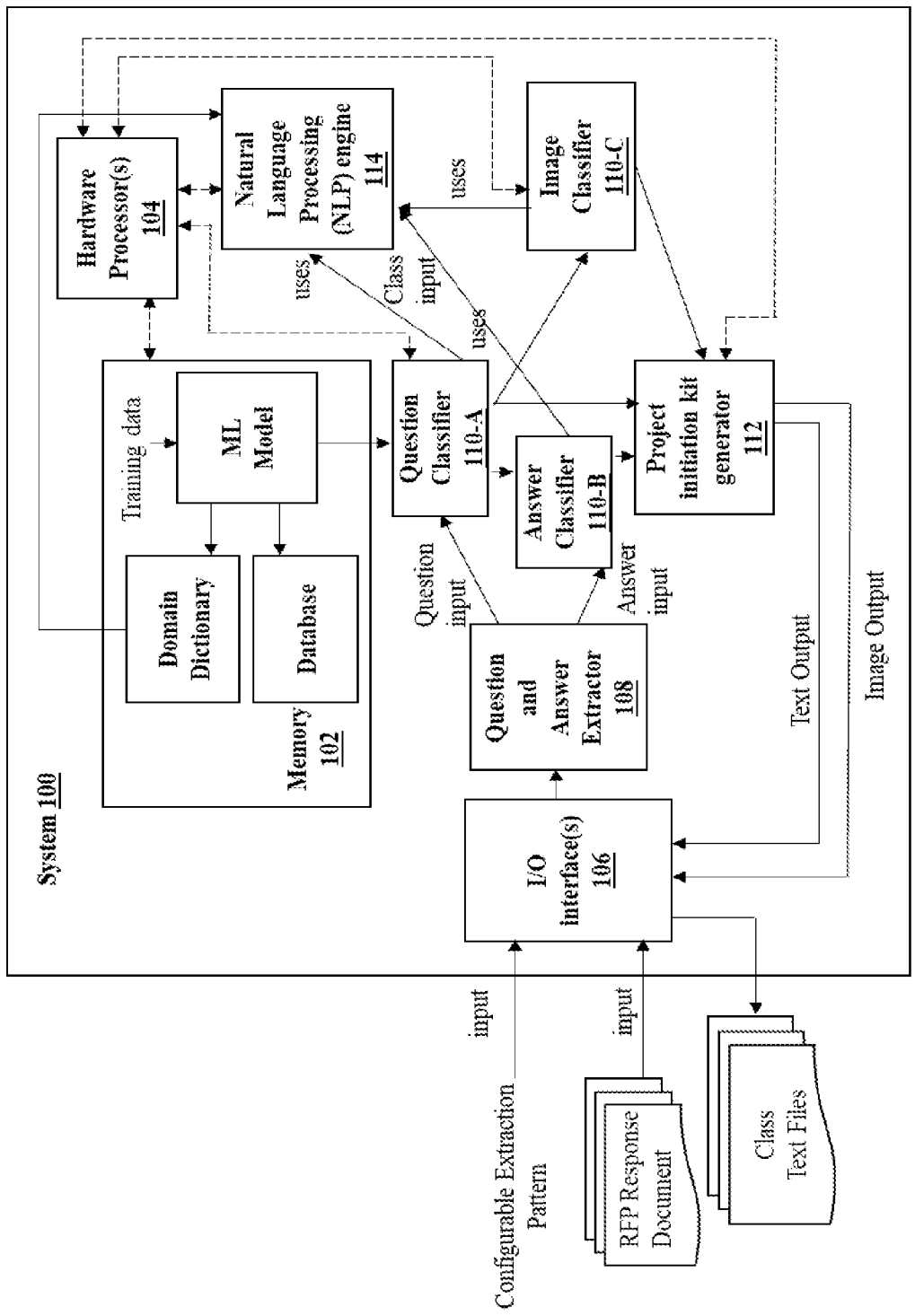
FIG. 1 illustrates an exemplary system for automated extraction and classification of project initiation related information from request for proposal response documents according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Project planning in organizations starts with project initiation phase in which high-level project objectives, commitments, requirements, and risks are identified. Current industry practice largely relies on a project manager's experience to carry out the project initiation activities keeping in view customer context and commitments made. Typically, a project manager involves multiple stakeholders such as Human resource (HR) team, Administration team, Infrastructure team for the project initiation phase to understand and outline requirements for each group.

The Project Manager (PM) needs to understand scope and commitments of the project to prepare a project plan/work breakdown structure (WBS). If there are specific infrastructure (IS) requirements in terms of servers, licenses, and/or the like, that must be planned early with the IS teams. Further, any special skills needed for the project must be intimated in advance to the Human Resources (HR) teams for identifying suitable people. Administration planning for workspace, Offshore Development Center (ODC) setup, any shift requirements, and/or the like must start early to avoid hiccups later. Project initiation is where all these requirements need to be identified and feasibility studied. A mismatch in requirements identification can result in huge mismatch in expectations and consequent schedule slippages. Many times, important information is missed during the transfer of information from one team to another team resulting in not meeting customer expectations and delivery slippages.

Software RFP response documents contain important information on factors that impact success of software projects. The RFP response document comprises solutions to client questions pertaining to project, organization, capability, approach, scope, commitments, and many other project related information and can be a good information source to leverage in an automated approach to provide a jump start to the project initiation process. However, as the RFP response document is in natural language, it is vulnerable to multiple interpretations. Also, large size of RFP response document may exacerbate the problem further. Typically, the RFP response document can run into hundreds of pages and relevant information of interest may spread all over the RFP response document. Hence, it takes time and effort to manually retrieve right information related to a stakeholder with relevant project initiation concerns. Thus, project initiation is required to be automated.

Embodiments of the present disclosure provide systems and methods for automated extraction and classification of project initiation related information from request for proposal (RFP) response documents. The RFP response document is parsed using document structure based parsing technique to identify questions and answers. The questions from the RFP response document are classified into different classes of interest (referred as InfoClasses) and important information from the answers are extracted and mapped to the identified class. The method of the present disclosure helps in reducing volume of information and provide a quick access to class-specific relevant information from the RFP response document. More Specifically, the present disclosure describes the following:

1. Definition of classes of information related to various stakeholders in project initiation.
2. Automated question and answer/response extraction from the RFP response document.
3. Extracting, classifying, and generating project initiation relevant information from the RFP response.

Referring now to the drawings, and more particularly to FIGS. 1 through 6B, where similar reference characters denote corresponding features consistently throughout the figures, there are shown preferred embodiments and these embodiments are described in the context of the following exemplary system and/or method.

FIG. 1 illustrates an exemplary system 100 for automated extraction and classification of project initiation related information from request for proposal (RFP) response documents according to some embodiments of the present disclosure. In an embodiment, the system 100 includes one or more hardware processors 104, communication interface device(s) or input/output (I/O) interface(s) 106 (also referred as interface(s)), a question and answer extractor 108, one or more classifiers 110, a project initiation kit generator 112, a Natural Language Processing (NLP) engine 114, and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W 5 and protocol types, including wired networks, for example, LAN, cable, etc., and wireless networks, such as WLAN, cellular, or satellite. In an embodiment, the I/O interface device(s) can include one or more ports for connecting a number of devices to one another or to another server. In the system 100, the I/O interface(s) 106 can be configured to provide appropriate interface(s) and/or channels for a user to interact with the system to perform one or more permitted actions. For example, an authorized user can access the system 100 through the I/O interface(s) 106 to provide data to the question and answer extractor 108. In another example, the I/O interface(s) 106 allows one or more users to feed an RFP response document and a configurable extraction pattern as inputs to the system 100. Further, the system 100 may use the I/O interface(s) 106 to provide one or more composed stakeholder specific documents as output to the user. The I/O interface(s) 106 may be further configured to provide appropriate channels and interfaces (depicted as dotted as well as thick lines in FIG. 1) for different components of the system 100 to communicate with one another. The system 100 can be configured to receive, using I/O interface(s) 106, at least one RFP response document and a configurable extraction pattern which specifies heading and style related information of the RFP response document, as input. All such data may be stored in the memory 102 and may further fed to the question and answer extractor 108, the one or more classifiers 110, the project initiation kit generator 112, the NLP engine 114, and to any other component of the system 100 for further processing. The one or more classifiers 110 include a question classifier 110-A, an answer text classifier 110B and an image classifier 110-C.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may also store the configurable extraction pattern, a domain dictionary that contains data pertaining to domain specific parameters (such as but not limited to terms, and synonyms) pertaining to at least one domain. The domain dictionary maybe augmented to the NLP engine 114. The memory 102 stores a plurality of instructions which when executed, cause the one or more hardware processors 104 to perform one or more actions and corresponding data processing associated with the project initiation related information extraction from the RFP response documents being handled by the system 100. In an embodiment, the plurality of instructions maybe part of one or more machine learning models which are stored in the memory 102. The one or more machine learning models are trained using a training data. Corpus of the training data is prepared using questions from past RFP response documents stored in the memory 102. The memory 102 may also be configured to update data stored, at least based on the data obtained from the I/O interface(s) 106. The memory 102 also includes a database which is used to store questions and/or the answers extracted from the RFP response document received by the system 100. In addition to the domain dictionary, the configurable extraction pattern, and the database, the memory module(s) 102 may store any other data associated with project initiation related information from the RFP response documents being handled by the system 100. The memory module 102 may also store extracted questions and corresponding answers, a set of predefined project initiation classes, data associated with one or more machine learning models, data associated with the one or more classifiers, project initiation related information, composed stakeholder specific documents involved in project initiation process, in one or more associated databases. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

The question and answer extractor 108 is configured to receive the RFP Response document and the configurable extraction pattern as an input to extract a plurality of questions and answers from the RFP Response document. The plurality of extracted questions is fed to the question classifier 110A. Answer contains relevant information in two forms that is text and images. The question classifier 110-A is configured to receive the plurality of extracted questions as the input and classifies it into at least one of the set of the predefined project initiation classes using at least one of the one or more machine learning models and the NLP engine 114. In an embodiment, text comprised in each of the plurality of corresponding answers that are extracted using the question and answer extractor is further classified using the answer classifier 110-B and text comprised in each image (alternatively referred as image text) inside each of the plurality of answers is extracted using the image classifier 110-C. In an embodiment, both the answer classifier 110-B and the image classifier 110-C use the NLP engine 114. The NLP engine 114 is configured to preprocess the extracted image text and classified answers, in light of the domain dictionary prior to matching for identified classes of the question from the set of predefined project initiation classes.

Figure 2:
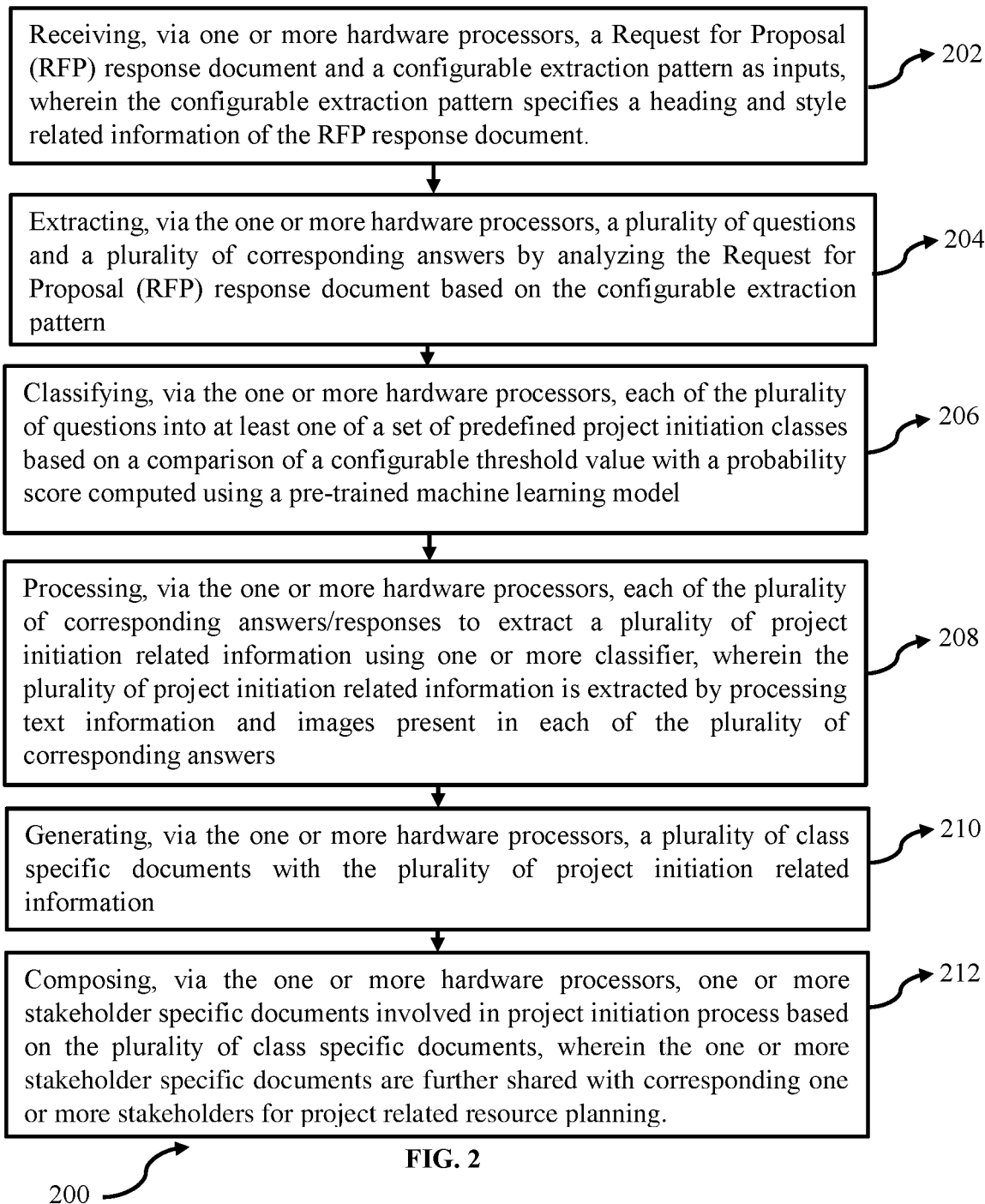
FIG. 2 illustrates an exemplary flow diagram illustrating a method for automated extraction and classification of project initiation related information from request for proposal response documents in accordance with some embodiments of the present disclosure.

The project initiation kit generator 112 is configured to receive output of the one or more classifiers corresponding to at least one RFP response document received as input by the question and answer extractor 108 of the system 100, using the process explained in FIG. 2 description. The project initiation kit generator 112 is configured to generate class specific documents and stakeholder specific documents involved in the project initiation process based on a plurality of class specific documents.

FIG. 2, with reference to FIGS. 1, depicts an exemplary flow chart illustrating a method 200 for automated extraction and classification of project initiation related information from request for proposal response documents, using the system 100 of FIG. 1, in accordance with an embodiment of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1. In an embodiment, at step 202 of the present disclosure, the one or more hardware processors 104 are configured to receive a Request for Proposal (RFP) response document and a configurable extraction pattern as input. In an embodiment, the system 100 may be able to receive and process more than one RFP response document at a time. However, for explanation purpose, a single RFP response document is considered. This does not intent to limit scope of the embodiments in any manner. As RFP response document may have different document structures, the configurable extraction pattern is used for externalizing this information. The configurable extraction pattern specifies a heading and style related information of the RFP response document for RFP questions and answers. Externalization of heading style information through the configurable extraction pattern help to handle structural variations and extract all question and answer information.

In an embodiment, at step 204 of the present disclosure, the one or more hardware processors 104 are configured to extract a plurality of questions and corresponding answers by analyzing the RFP response document based on the configurable extraction pattern. As depicted in FIG. 1, the RFP response document and the configurable extraction pattern is provided as an input to the question and answer extractor 108. In an embodiment, questions and corresponding answers from the RFP response document are extracted using a Docx4J API using styled information as specified in the configurable extraction pattern. The question and answer extractor 108 analyze content of the RFP response document. Based on the analysis, if the content is identified as a paragraph, then the identified paragraph is matched with the configurable extraction pattern. If the match is found, the content is identified as a question, otherwise identified as an answer. In an embodiment, text after RFP question till next question or end of document is also considered as an answer. The extracted questions and answers are further in stored in a question array list and an answer array list. The entire flow of extracting plurality of questions and corresponding answers using the question and answer extractor 108 can be further better understood by way of following pseudo code provided as example:

```
Input: RFP response documents
Output: QuestionArrayList, AnswerArrayList.
   1.  Read the RFP response document using Docx4J
   2.  qIndex = −1
   3.  Skip content till first question
   4.  for each Content P in document do
   5.     if P is Paragraph then
   6.        if P matches the question pattern then
   7.           qIndex + +
   8.           P is identified as the question
   9.           Store P in the QuestionArrayList[qIndex]
   10.       else
   11.          Store P in AnswerArrayList[qIndex]
   12.       end if
   13.    end if
   14.end for
```

Figure 3:
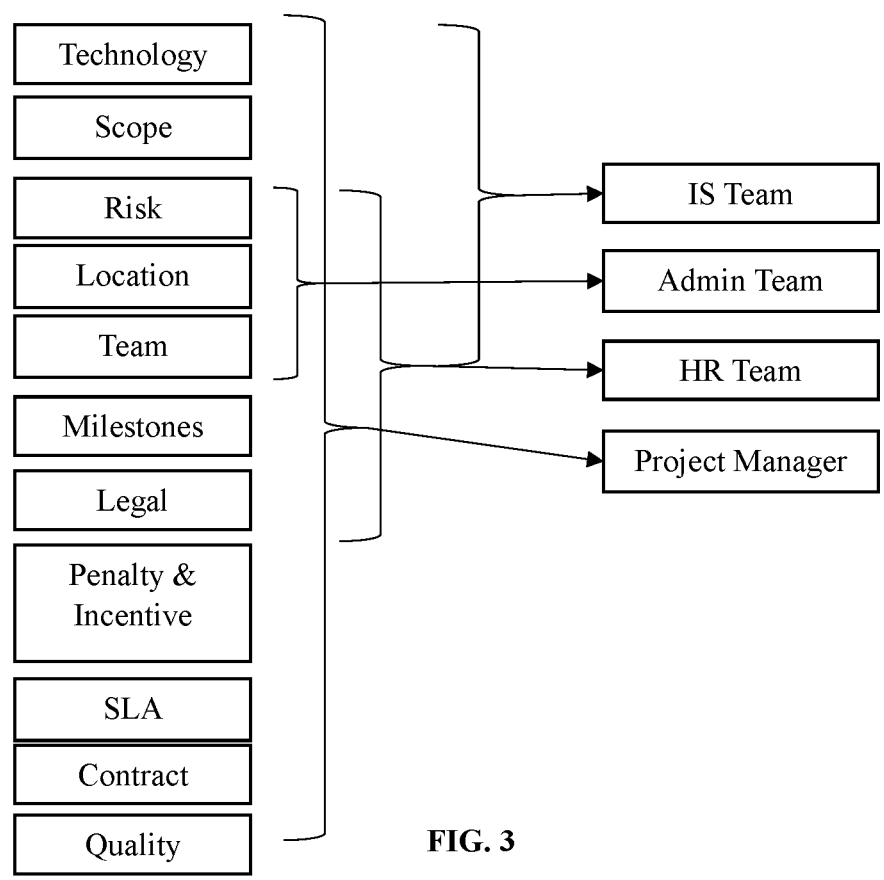
FIG. 3 illustrates a mapping of stakeholders involved in project initiation process with a set of project initiation predefined classes according to some embodiments of the present disclosure.

In an embodiment, at step 206 of the present disclosure, the one or more hardware processors 104 are configured to classify, each of the plurality of questions into at least one project initiation class of a set of predefined project initiation classes based on a comparison of a configurable threshold value with a probability score computed using a pre-trained machine learning (ML) model. In an embodiment, each of the set of predefined project initiation classes comprises information relevant to one or more stakeholders involved in the project initiation process. In the context of the present disclosure, the set of predefined project initiation classes could be referred as project initiation related information classes or InfoClasses In the present disclosure, eleven InfoClasses were found relevant for extraction of the project initiation related information from multiple RFP response documents. However, InfoClasses can be further refined as per stakeholder specific project initiation information requirements. In an example embodiment, the InfoClasses may include but not limited to Technology, Scope, Risk, Location, Team, Milestones, Legal, Penalty & Incentive, SLA, Contract, And Quality. FIG. 3 provides a mapping of stakeholders involved in project initiation process with a set of predefined project initiation classes according to some embodiments of the present disclosure. For instance, Admin team concerns are Risk, Location, Team and thus mapped to these classes. These are also concerns of other stakeholders along with additional concerns. For example, HR additional concern is Milestones and Legal. Similarly, IS team's additional concerns are Technology and Scope. However, for Project Manager all the concerns are applicable.

The Question Classifier 110A takes the extracted question as the input and classifies it into one or more of the Info Classes using the pre-trained ML model and a Natural Language Processing (NLP) engine 114. The NLP engine 114 is created using OpenNLP models. In an embodiment, the step of classification is preceded by a preprocessing step that includes removal of stop words, conversion of words into root form using lemmatization, and replacing taxonomical variations in words with common words from the domain specific dictionary. In other words, as a first step, question text is preprocessed using the NLP engine 114. In preprocessing stop-words are removed, words are converted into root-form using lemmatization, and taxonomical variations in words are replaced with common words from the domain dictionary. In an embodiment, for identifying the root form of words and taxonomical variations, the OpenNLP models were found useful. However, some domain-specific words were not covered by the OpenNLP models. For example, disaster recovery, business continuity refers to the Risk InfoClass but were not covered in the OpenNLP Models. These taxonomical variations are specified using the domain dictionary comprising InfoClasses. A matching algorithm replaces these taxonomical variation terms with common term from the domain dictionary before performing matching. Preprocessed question text is then classified using the pre-trained ML model. In an embodiment, ML model is trained using training data. The corpus of training data is prepared using questions from the past RFP response documents. In the present disclosure, Sixteen RFP response documents from 8 different subunits of an IT services domain for various geographies are used for data preparation. Further, approximately 200 questions from these RFP response document set are labeled with InfoClass names. For validating the classification, an 80%-20% split is performed on the classified data for training and testing. The split was done randomly for each InfoClass to avoid any bias for training the ML model. In an embodiment, maximum entropy (Maxent) classifier is used for the classification. Maxent algorithm that assumes conditional dependence of features is used since the features in the present disclosure are words which are dependent of each other (i.e., word sequence). In an embodiment, the pre-trained ML model is validated on test data to determine the configurable threshold value of probability score. In an embodiment, when the probability score (alternatively referred as ML probability score) computed using the pre-trained machine learning (ML) model exceeds the configurable threshold value, a question from the plurality of questions is classified into at least one of a set of predefined project initiation classes. Otherwise, the question from the plurality of questions remains unclassified. In an example of the present disclosure, the configurable threshold value is calibrated as 0.14.

The entire flow of classifying each of the plurality of questions using the question classifier 110A can be further better understood by way of following pseudo code provided as example:

```
Input: QuestionArrayList
Output: QuestionClassList
for each question Q from QuestionArrayList do
    NLP preprocess Q
    classify Q using the ML model classifier
       if ML probability score > threshold then
           classify Q in the predicted InfoClass
       else
           classify Q as unclassified
       end if
end for
```

In an embodiment, at step 208 of the present disclosure, the one or more hardware processors 104 are configured to process each of the plurality of corresponding answers to extract a plurality of project initiation related information using one or more classifiers. In an embodiment, the plurality of project initiation related information is extracted by processing text information and images present in each of the plurality of corresponding answers. In an embodiment, the one or more classifiers utilize a domain specific dictionary and natural language processing based techniques for processing text information and an Optical Character Recognition (OCR) technique for processing images comprised in each of the plurality of corresponding answers.

In an embodiment, the plurality of extracted answers may contain project initiation related information in two forms that is text and images. The text comprised in each of the plurality of corresponding answers that are extracted using the question and answer extractor is further classified using the answer classifier 110-B and text comprised in each image (alternatively referred as image text) inside each of the plurality of answers is extracted using the image classifier 110-C. In an embodiment, both the answer classifier 110-B and the image classifier 110-C use the NLP engine 114. The NLP engine 114 is configured to preprocess the extracted image text and classified answers, in light of the domain dictionary prior to matching for identified classes of the question from the set of predefined project initiation classes.

The entire flow of classifying each of the plurality of extracted answers using the answer classifier 110-B can be further better understood by way of following pseudo code provided as example:

```
Input: QuestionClassList, A (Answer)
    for each T in A do
        NLP preprocess T
        match T with Q class in QuestionClassList
        if match then
            classify T as relevant paragraph for Q class
            print in class specific file
        end if
    end for
```

The entire flow of classifying text comprised in each image (alternatively referred as image text) inside each of the plurality of answers is extracted using the image classifier 110-C can be further better understood by way of following pseudo code provided as example:

```
Input: QuestionClassList, I (Image)
    Extract text T_i from I using OCR
    NLP preprocess T_i
    match T_i with Q class in QuestionClassList
    if match then
    classify I as relevant image
    print in class specific file
```

The information comprised in the plurality of extracted answers corresponding to the classified questions is then further processed to extract only the project initiation related information including class text and images using the OpenNLP models. The OpenNLP models and domain dictionary based matching approach is preferred for information extraction from answer text since it is a binary classification problem. The output text corresponding to individual classes is then generated into class-specific files. As depicted in FIG. 1, the project initiation kit generator 112 receives output of the one or more classifiers 110 corresponding to at least one RFP response document received as input by the question and answer extractor 108 of the system 100. The project initiation kit generator 112 is configured to generate class specific documents and stakeholder specific documents involved in the project initiation process based on a plurality of class specific documents. A document file is created for each of the set of predefined project initiation classes and each classified question mapped to class relevant text is printed along with relevant images in this file.

The entire flow of the project initiation kit generator 112 can be further better understood by way of following pseudo code provided as example:

```
Input: QuestionArrayList, AnswerArrayList
    Output: Class Specific Documents, Stake Holder
        Specific Documents
    for each Q from QuestionArrayList do
```

-continued

```
        QuestionClassList = Question Classify(Q)
        A = AnswerArrayList [qIndex]
        Answer Classify (QuestionClassList, A)
        for each image I from ImageArrayList do
            Image Classify( QuestionClassList , I)
        end for
    end for
    for each stakeholder
``` print stakeholder specific file combining the class specific file

Referring back to steps of FIG. 2 of the present disclosure, at step 210, the one or more hardware processors are configured to generate a plurality of class specific documents with the plurality of project initiation related information. In an embodiment, at step 212 of the present disclosure, the one or more hardware processors 104 are configured to compose one or more stakeholder specific documents involved in project initiation process based on the plurality of class specific documents. In other words, the one or more stakeholder specific documents are generated by combining all applicable class specific documents generated for a specific stakeholder. In an embodiment, the one or more stakeholder specific documents are further shared with corresponding one or more stakeholders for project related resource planning. The one or more stakeholder specific files are used by the project manager to communicate project initiation related information with the respective stakeholders. For example HR Team stakeholder file information is used to identify special skills needed for the project to intimate HR teams for identifying suitable people. Similarly, Admin Team stakeholder file information is used to identify workspace, ODC setup requirements to intimate Admin team.

The steps 202 till 212 are better understood by way of the following examples provided as exemplary explanation.

FIG. 4 depicts an example of a part of the RFP response document comprising one question and a corresponding answer received as an input by the system of FIG. 1, according to some embodiments of the present disclosure. The example of the part of the RFP response document comprising one question and the corresponding answer is further processed in accordance with the method described in FIG. 2. As a first step, a question and corresponding answer is extracted from the example RFP response document.

For example, the question extracted from the example RFP response document is 'Detail the Cost Drivers and how they are to be managed for this Contract'. The extracted question is further classified into at least one of the sets of predefined classes by the question classifier 110-A using NLP engine 114 and the pre-trained ML model. For example, the above specified question is classified into 'Contract' class. Further, project initiation related text information for the question classified into 'Contract' class is extracted from its corresponding answer. In the example RFP response document, project initiation related text information includes text comprised in paragraph 2, 3, 5, 7 and 8. As can be seen in FIG. 4, the example of the part of RFP response document comprise an image also. Text in the image is extracted using the Optical Character Recognition (OCR) technique. In the example RFP response document, extracted image text includes words such as FTEs, Benefit, contract period, committed, deliver, and year. The extracted image text is further classified into 'Contract' class hence found relevant to add in generated "Contract" file. A class specific document file is created for the 'Contract' class and the classified question is mapped to class relevant text which is further printed along with relevant images in this file.

An example of a class specific document generated as the output for the example of the part of the RFP response document of FIG. 4 comprising one question and the corresponding answer is depicted in FIG. 5. In a few scenarios, the RFP response document does not comprise images, the need for image text extraction and classification is eliminated in such cases.

Evaluation:

The system of the present disclosure has been validated with real life RFP responses for five customers. As a sample set, the RFP response documents having different sets of questions for various subunits of an IT services domain are chosen. The method of the present disclosure is executed with this sample set. The plurality of generated class specific documents containing the project initiation related information is manually validated. In an embodiment, validation is carried out in two dimensions namely correctness of question classification and percentage of PI information generated. The correctness of question classification is verified to check whether questions are correctly classified to the relevant InfoClass and the questions that are unrelated to the project initiation are unclassified. Further, accuracy of RFP question classification is computed using a formula provided as equation (1) below:

$$\text{Classification Accuracy} = \left( \frac{\sum (\text{Classified } Q \text{ Count})}{\sum (RFP \ Q \text{ Count})} \right) * 100 \quad (1)$$

Further, corresponding to each classified question, its corresponding answer, class specific extraction of text and images is validated. In an embodiment, original size of the RFP response document is compared with generated output pages and project initiation information related information (represented by PI_InfoFromRFP) metric is computed. Project initiation related information metric is computed using equation (2) provided below:

$$\text{PI\_InfoFromRFP} = \left( \frac{\sum (RFP \ \text{PI\_Info Pages})}{\sum (RFP \ \text{Doc Pages})} \right) * 100 \quad (2)$$

Experimental Results

Table 1 provided below shows validation Input Data indicating RFP response document pages, number of questions for each RFP in validation set; Question (Q) Classification indicating number of classified questions, classification accuracy; Output Data indicating generated number of PI_Info Pages for each RFP are determined.

TABLE 1

| RFP | Input Data | | Q Classification | | Output Data |
| --- | --- | --- | --- | --- | --- |
|  | RFP Doc Pages | RFP Q Count | Classified Q Count | Accuracy | PI_Info Pages |
| RFP1 | 76.5 | 17 | 13 | 76.5 | 33 |
| RFP2 | 66.5 | 41 | 32 | 78.0 | 22 |
| RFP3 | 32.5 | 31 | 24 | 77.4 | 14 |

TABLE 1-continued

| RFP | Input Data | | Q Classification | | Output Data |
| --- | --- | --- | --- | --- | --- |
|  | RFP Doc Pages | RFP Q Count | Classified Q Count | Accuracy | PI_Info Pages |
| RFP4 | 14 | 22 | 16 | 72.7 | 6.25 |
| RFP5 | 38.75 | 12 | 9 | 75 | 19.25 |
| Total | 228.25 | 123 | 94 |  | 94.5 |

Equations (3) and (4) below are used to calculate mean classification accuracy and PI_InfoFromRFP.

$$\text{Mean Classification Accuracy} = \left( \frac{94}{23} \right) * 100 = 76.42\% \quad (3)$$

$$\text{PI\_InfoFromRFP} = \left( \frac{94.5}{228.25} \right) * 100 = 41.4\% \quad (4)$$

Figure 6A:
FIGS. 6A and 6B provide a graphical representation illustrating experimental results for automated extraction and classification of project initiation related information from request for proposal response documents according to some embodiments of the present disclosure.
Figure 6B:
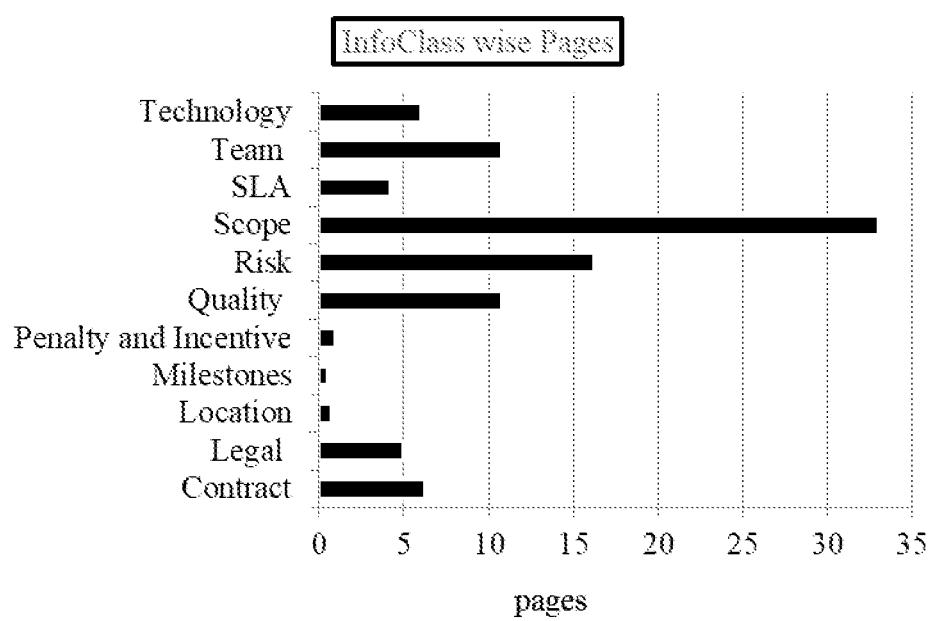

FIG. 6A provides a graphical representation illustrating trend of extracted project initiation related information with respect to original RFP response document content. In FIG. 6A, number of pages in the RFP response documents is shown with black color, whereas consolidated class specific project initiation related information (PI Info) pages generated corresponding to the RFP response documents is shown with dotted line. As can be seen from FIG. 6A, there is lot of reduction in number of pages generated through the system 100. FIG. 6B provides a graphical representation illustrating further details of class specific project information pages across information classes consolidated for 5 RFPs. FIG. 6B indicates that the number of pages related to the classes of project initiation was varying. For few classes such as Location, Milestones, Penalty and Incentive, and SLA, total information available for all RFP is less than 5 pages. For Scope and Risk classes, the total number of pages is maximum.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The embodiments of present disclosure provide an artificial intelligence based approach for automated extracted and classification of project initiation related information from the RFP response documents. The method of the present disclosure is validated on an industrial case study for IT services domain. While the technology has been validated for a specific business unit, it can also be easily applied to other business units as the method of the present disclosure is generic and domain agnostic. The method of the present disclosure demonstrates significant improvement in terms of classification accuracy and time consumed to analyze the RFP document by reducing volume of the data comprised in the RFP response document as compared to conventional approaches.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein by the following claims.

What is claimed is:

1. A processor implemented method, comprising:
   receiving, via one or more hardware processors, a Request for Proposal (RFP) response document and a configurable extraction pattern as inputs, wherein the configurable extraction pattern specifies a heading and style related information of the RFP response document;
   extracting, via the one or more hardware processors, a plurality of questions and a plurality of corresponding answers by analyzing the Request for Proposal (RFP) response document based on the configurable extraction pattern;
   classifying, via the one or more hardware processors, each of the plurality of questions into at least one project initiation class of a set of predefined project initiation classes based on a comparison of a configurable threshold value with a probability score computed using a pre-trained machine learning model;
   processing, via the one or more hardware processors, each of the plurality of corresponding answers to extract a plurality of project initiation related information using one or more classifiers, wherein the plurality of project initiation related information is extracted by processing text information and images present in each of the plurality of corresponding answers;
   generating, via the one or more hardware processors, a plurality of class specific documents with the plurality of project initiation related information; and
   composing, via the one or more hardware processors, one or more stakeholder specific documents involved in project initiation process based on the plurality of class specific documents, wherein the one or more stakeholder specific documents are further shared with corresponding one or more stakeholders for project related resource planning.

2. The processor implemented method of claim 1, wherein each of the set of predefined project initiation classes comprises information relevant to one or more stakeholders involved in the project initiation process.

3. The processor implemented method of claim 1, wherein the one or more classifiers utilize a domain specific dictionary and natural language processing based techniques for processing text information and an optical character recognition technique for processing images comprised in each of the plurality of corresponding answers.

4. The processor implemented method of claim 1, wherein the step of classification is preceded by a preprocessing step that includes removal of stop words, conversion of words into root form using lemmatization, and replacing taxonomical variations in words with common words from the domain specific dictionary.

5. A system, comprising:
   a memory storing instructions;
   one or more communication interfaces;
   a question and answer extractor;
   one or more classifiers;
   a project initiation kit generator;
   a Natural Language Processing (NLP) engine; and one or more hardware processors coupled to the memory via the one or more communication interfaces, wherein the one or more hardware processors are configured by the instructions to:

receive a Request for Proposal (RFP) response document and a configurable extraction pattern as inputs, wherein the configurable extraction pattern specifies a heading and style related information of the RFP response document;

extract a plurality of questions and a plurality of corresponding answers by analyzing the Request for Proposal (RFP) response document based on the configurable extraction pattern;

classify each of the plurality of questions into at least one project initiation class of a set of predefined project initiation classes based on a comparison of a configurable threshold value with a probability score computed using a pre-trained machine learning model;

process each of the plurality of corresponding answers to extract a plurality of project initiation related information using the one or more classifiers, wherein the plurality of project initiation related information is extracted by processing text information and images present in each of the plurality of corresponding answers;

generate a plurality of class specific documents with the plurality of project initiation related information; and compose one or more stakeholder specific documents involved in project initiation process based on the plurality of class specific documents, wherein the one or more stakeholder specific documents are further shared with corresponding one or more stakeholders for project related resource planning.

6. The system of claim 5, wherein each of the set of predefined project initiation classes comprises information relevant to one or more stakeholders involved in the project initiation process.

7. The system of claim 5, wherein the one or more classifiers utilize a domain specific dictionary and natural language processing based techniques for processing text information and an optical character recognition technique for processing images comprised in each of the plurality of corresponding answers.

8. The system of claim 5, wherein the step of classification is preceded by a preprocessing step that includes removal of stop words, conversion of words into root form using lemmatization, and replacing taxonomical variations in words with common words from the domain specific dictionary.

9. One or more non-transitory machine-readable information storage mediums comprising one or more instructions which when executed by one or more hardware processors cause:

receiving, a Request for Proposal (RFP) response document and a configurable extraction pattern as inputs, wherein the configurable extraction pattern specifies a heading and style related information of the RFP response document;

extracting, via the one or more hardware processors, a plurality of questions and a plurality of corresponding answers by analyzing the Request for Proposal (RFP) response document based on the configurable extraction pattern;

classifying, via the one or more hardware processors, each of the plurality of questions into at least one project initiation class of a set of predefined project initiation classes based on a comparison of a configurable threshold value with a probability score computed using a pre-trained machine learning model;

processing, via the one or more hardware processors, each of the plurality of corresponding answers to extract a plurality of project initiation related information using one or more classifiers, wherein the plurality of project initiation related information is extracted by processing text information and images present in each of the plurality of corresponding answers;

generating, via the one or more hardware processors, a plurality of class specific documents with the plurality of project initiation related information; and composing, via the one or more hardware processors, one or more stakeholder specific documents involved in project initiation process based on the plurality of class specific documents, wherein the one or more stakeholder specific documents are further shared with corresponding one or more stakeholders for project related resource planning.

10. The one or more non-transitory machine-readable information storage mediums of claim 9, wherein each of the set of predefined project initiation classes comprises information relevant to one or more stakeholders involved in the project initiation process.

11. The one or more non-transitory machine-readable information storage mediums of claim 9, wherein the one or more classifiers utilize a domain specific dictionary and natural language processing based techniques for processing text information and an optical character recognition technique for processing images comprised in each of the plurality of corresponding answers.

12. The one or more non-transitory machine-readable information storage mediums of claim 9, wherein the step of classification is preceded by a preprocessing step that includes removal of stop words, conversion of words into root form using lemmatization, and replacing taxonomical variations in words with common words from the domain specific dictionary.

* * * * *